C. D. PERKINS.
Improvement in Cultivators.

No. 131,066. Patented Sep. 3, 1872.

Witnesses:
E. Wolff
Alex F. Roberts

Inventor.
C. D. Perkins
Per
Attorneys.

UNITED STATES PATENT OFFICE.

CALVIN D. PERKINS, OF PRINCEVILLE, ILLINOIS.

IMPROVEMENT IN CULTIVATORS.

Specification forming part of Letters Patent No. 131,066, dated September 3, 1872.

Specification describing a new and useful Improvement in Cultivator, invented by CALVIN D. PERKINS, of Princeville, in the county of Peoria and State of Illinois.

Figure 1:
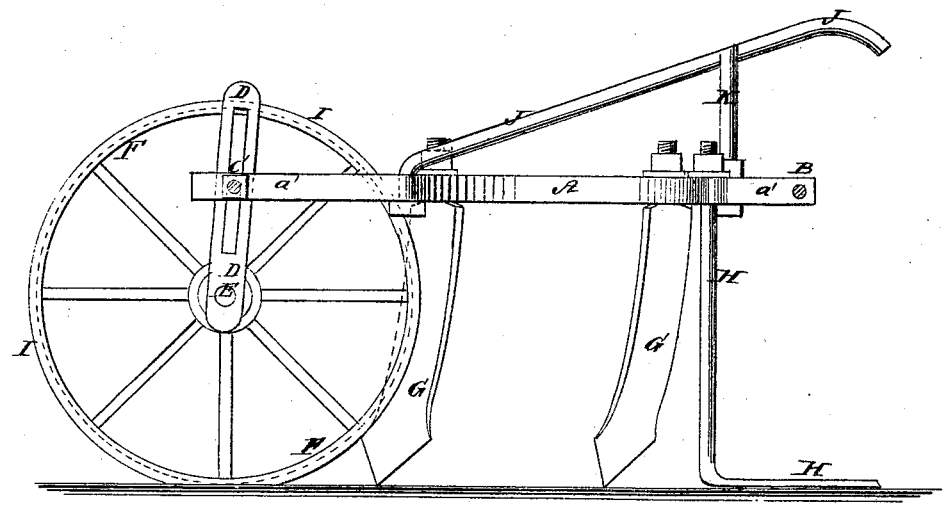
Figure 2:
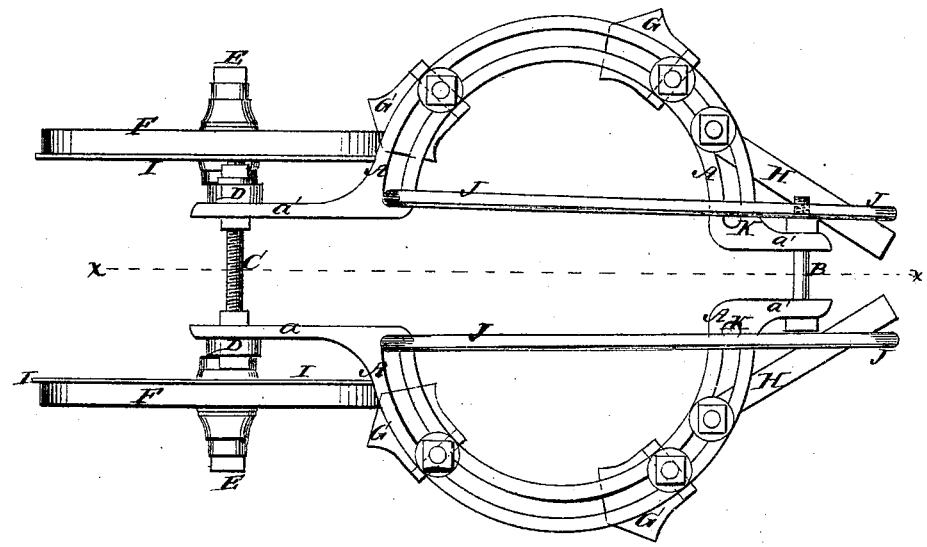

Figure 1 is a detail vertical longitudinal section of my improved cultivator taken through the line $x\ x$, Fig. 2. Fig. 2 is a top view of the same.

Similar letters of reference indicate corresponding parts.

My invention has for its object to furnish an improved cultivator designed especially for garden use as a hand-machine, and which shall be simple in construction, convenient in use, effective in operation, and easily adjusted as required, and which may be made larger to adapt it for field use; and it consists in the construction and combination of various parts of the machine, as hereinafter more fully described.

The frame of the machine consists of two bars, A, the ends $a'$ of which project nearly radially so as to be parallel with each other. The ends $a'$ at the rear of the machine are connected by a bolt, B. The ends $a'$ at the front of the machine are connected by a bolt, C. The bolt C also passes through slots in the bars D, to the lower ends of which are attached the journals E, upon which the drive-wheels F revolve, and which project at right angles with said bars D. By this construction, by adjusting the position of the bars D upon the bolt C the machine will be adjusted to work at any desired depth in the ground. The curved parts of the bars A are slotted longitudinally, as shown in Fig. 2, to receive the shanks of the plows G and cutters H where they are secured in place by washers and nuts, as shown in Figs. 1 and 2. By this construction, by adjusting the position of the shanks of the plows G in the slots of the bars A the plows may be adjusted to throw the soil more or less toward the plants, as may be desired. H are the cutters, which are bent at right angles so that the blades may work in a horizontal position a little below the surface of the ground to cut off the roots of grass, weeds, runners, or other vegetation that may be growing between the rows of plants. By adjusting the shanks of the cutters H in the slots of the bars A the cutting-blades may be adjusted to work at right angles, or at any other angle, with the line of draft, as may be desired. Upon the rims of the drive-wheels F are formed, or to them are attached, ring flanges or cutters I, to cut off runners that may be thrown out from the rows or hills of plants, such as strawberries, and thus prevent the said plants from spreading. J are the handles, the forward ends of which are inserted and secured in the forward ends of the slots in the bars A. The rear parts of the handles J are supported adjustably by standards K, the upper ends of which are attached to the said handles, and the lower ends of which are secured in the rear ends of the slots in the bars A.

The plows may be adjusted to work closer to or further from the plants by moving the bars A toward or from each other by means of the bolts B C.

Having thus described my invention, I claim as new and desire to secure by Letters Patent—

1. The slotted semicircular bars A, made with projecting ends $a'$, to receive the adjustable connecting-bolts B C, substantially as herein shown and described, and for the purpose set forth.

2. The slotted bars D, in combination with the bolt C and forward ends $a'$ of the slotted semicircular bars A, for the purpose of connecting the drive-wheels F with said bars A adjustably, substantially as herein shown and described.

CALVIN D. PERKINS.

Witnesses:
 PETER AUTEN,
 J. M. SABIN.